United States Patent [19]
Jee

[11] Patent Number: 5,393,974
[45] Date of Patent: Feb. 28, 1995

[54] METHOD AND APPARATUS FOR DETECTING THE MOTION VARIATION OF A PROJECTILE

[76] Inventor: Sung N. Jee, 235-1, Kaehwa-dong Kangso-gu, Seoul, Rep. of Korea

[21] Appl. No.: 46,330

[22] Filed: Apr. 14, 1993

[30] Foreign Application Priority Data

Mar. 6, 1993 [KR] Rep. of Korea .................. 93-3399

[51] Int. Cl.$^6$ ..................... G01P 3/66; G01V 9/04
[52] U.S. Cl. .................................. 250/222.1; 324/178
[58] Field of Search .............. 250/221, 222.1, 208.2; 73/488, 503, 510, 514; 356/28; 324/178

[56] References Cited

U.S. PATENT DOCUMENTS

| | | | |
|---|---|---|---|
| 3,025,406 | 3/1962 | Stewart et al. | 250/222.1 |
| 3,398,288 | 8/1968 | Sanders et al. | 250/222.1 |
| 4,128,761 | 12/1978 | Oehler | 324/178 |
| 4,180,726 | 12/1979 | De Crescent | 324/178 |
| 4,272,189 | 6/1981 | Bailey et al. | 356/28 |
| 4,574,238 | 3/1986 | Weinlich | 250/222.1 |

Primary Examiner—David C. Nelms
Assistant Examiner—Stephone B. Allen
Attorney, Agent, or Firm—Morgan & Finnegan

[57] ABSTRACT

A method and apparatus for detecting the motion variation of a baseball is described, the apparatus including: a plurality of sensors between a beginning point and an ending point of motion, the sensors detecting the position variation of a pitched baseball using two-dimensional coordinate values; and a controller for synchronizing the two-dimensional coordinate values output from the sensors to an inside clock being input the synchronized values, and for calculating the speed of a baseball according to the distance between predetermined sensors and the detected two-dimensional coordinate values. Accordingly, the present invention can detect a curving degree and speed variation of a baseball. Particularly, in the case that the lattice structures of the sensors are closely placed in the vicinity of a home plate, the user can minutely measure the motion variation of a baseball.

10 Claims, 1 Drawing Sheet

METHOD AND APPARATUS FOR DETECTING THE MOTION VARIATION OF A PROJECTILE

FIELD OF THE INVENTION

The present invention relates to a method and device for detecting the motion variation of a projectile, and more particularly relates to a method and device for detecting the velocity and course of a pitched baseball.

BACKGROUND OF THE INVENTION

Pitchers, who are in the most responsible charge of a baseball game, practice various techniques to vary the speed and direction of travel of a baseball. Presently, however, the speed of a pitched ball is merely measured at a specific position with a speedgun. The measurement of degree that a baseball falls, or curves to the left or the right side, depends on the naked eyes of the observer or the final stopping point of the baseball. Accordingly, there is a drawback to present baseball detection devices in that the curving degree and the velocity variation of a pitched ball between a pitcher and a home base are not exactly detected.

It is an object of the present invention to provide a method for detecting the motion variation of a baseball, wherein the method can detect a curving degree and the velocity variation of a pitched baseball, in order to solve the above-problems. To solve the problems, a plurality of sensors are situated at right angles to an imaginary straight line between a pitcher and a catcher. Each of the sensors detects the momentary passing positions of a pitched baseball in the form of a two-dimensional coordinate, and the time that a baseball passes through the sensors.

It is another object of the present invention to provide a device for detecting the motion variation of a baseball, which can detect the curving degree and the velocity variation of a pitched ball.

SUMMARY OF THE INVENTION

The object of the present invention is to provide a method for detecting the motion variation of a baseball, wherein the method includes the steps of: dividing an imaginary straight line between a first position corresponding to a pitcher and a second position corresponding to a catcher into designated intervals, and setting up a plurality of two-dimensional coordinate systems at right angles to the straight line, one at each of the plurality of divided positions; calculating section intervals between a plurality of the divided positions; outputting two-dimensional coordinate values corresponding to the position of the projectile passing through the respective coordinate systems; and detecting the quantity of motion variation of the projectile from the section intervals and the two-dimensional coordinate values.

Another object of the present invention is to provide a device for detecting the motion variation of a projectile, wherein the device includes sensors respectively situated at right angles to an imaginary straight line between a first position corresponding to a pitcher and a second position corresponding to a catcher each of the sensors being disposed at one of a plurality of positions dividing the imaginary straight line, the sensors having a plurality of light projectors and light receivers placed opposite each other, and sensing the two-dimensional coordinate values of the passing projectile; a controller for storing distance data between the divided positions, receiving the two-dimensional coordinate values from the sensors, and calculating the quantity of motion variation of the projectile; means for outputting the quantity of motion variation calculated by the controller in the designated form; and order input means for controlling the operation of the controller.

BRIEF DESCRIPTION OF THE DRAWINGS

The objects and features of the present invention will become apparent from a consideration of the following detailed description taken in conjunction with the accompanying drawings in which.

DETAILED DESCRIPTION

The first preferred embodiment of the present invention with reference to a method and apparatus for detecting the motion variation of a baseball will be described in detail in conjunction with the accompanying drawings.

Figure 1:
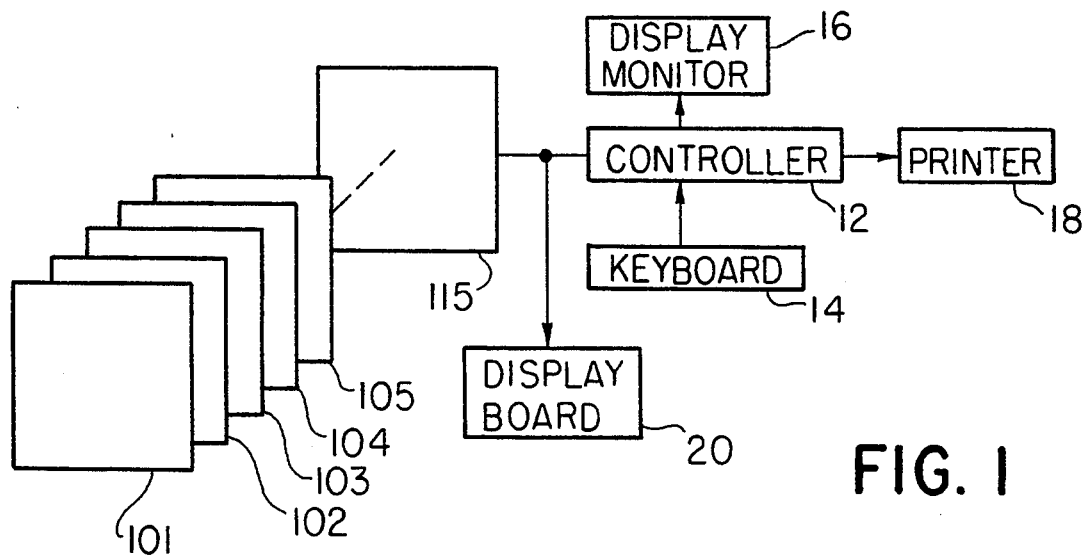
FIG. 1 is a block diagram showing a device for detecting the motion variation of a baseball according to the first preferred embodiment of the present invention.

FIG. 1 is a block diagram showing a device for detecting the motion variation of a baseball according to the first preferred embodiment of the present invention.

As shown in FIG. 1, the detector of the present invention arranges a plurality of sensors 101-115 on an imaginary straight line between a pitcher and catcher. The sensors 101-115 will be described in detail in conjunction with FIG. 2. Each of the sensors 101-115 detects passing positions of a pitched ball in the form of a two-dimensional coordinate value across the line. The two-dimensional coordinate values detected from the sensors 101-115 are input to controller 12. The controller 12 calculates and stores the position variation and the velocity variation of a baseball with the two-dimensional coordinate values. The controller 12 will be described in detail in conjunction with FIG. 3. The detector of the present invention further comprises key board 14 for controlling the function of the controller 12, monitor 16 for displaying data, and printer 18 for printing the data. Furthermore, it may be desirable to include a display board 10 for visually observing the data from a long distance.

The sensors 101-115 which detect the positions of a pitched baseball per distance interval and transmit the detected positions to the controller 12, are arranged to form lattice structures. The internal arrangement of respective lattice structures are freely changed according to a user's need.

Figure 2:
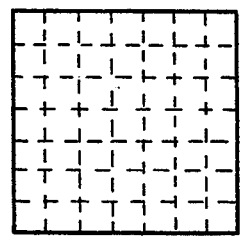
FIG. 2 is a conceptual diagram of a lattice structure according to the present invention.

FIG. 2 is a conceptual diagram of the arrangement of sensors 101-115, the sensors 101-115 being arranged in the form of lattice structures.

Each of the lattice structures includes a level adjusting function, and the lattice structures can have an area of three meters by three meters. For example, fifty light projectors can be placed, respectively, at the upper and right sides of the lattice at intervals of six centimeters, and fifty light receivers can be situated at the lower and left sides of the lattice at intervals of six centimeters. The light projectors each consist of a light diode which discharges infrared rays, and the light receivers each are made up of light receiving elements which receive the infrared rays discharged from the opposite light projectors. The first preferred embodiment of the present invention uses diodes discharging the infrared rays into light receiving elements, but the present invention is not limited to such a design. The present invention can utilize any suitable signal generator as long as the signal generator can detect the positions of an object passing through its lattice structure.

To protect the light projectors and the light receivers against external damage, the sensors 101–115 can include an attached protective band (not shown), which surrounds the light projectors and the light receivers.

Figure 3:
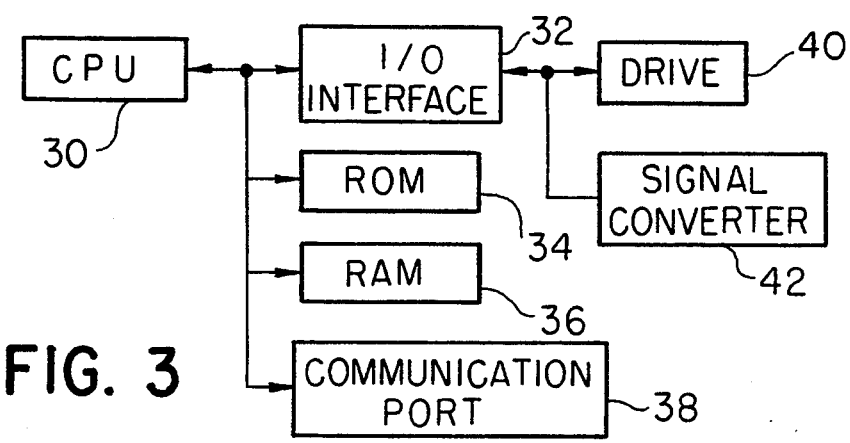
FIG. 3 is a detailed block diagram corresponding to a controller of FIG. 1.

FIG. 3 is a detailed diagram corresponding to the controller 12 in FIG. 1. The controller 12 comprises central processing unit (CPU) 30, ROM 34 for storing a program in order to calculate the speed of a baseball, RAM 36, communication port 38 for communicating with an external device (not shown), driving unit 40 for driving the light projectors of the above sensors 101–115, signal converter 42 connected to the light receivers for separately detecting and outputting a position signal by the light receivers indicating interrupted light according to each of the lattice structures, and input and output interface unit 32 for connecting driving unit 40, signal converter 42, and CPU 30. The driving unit 40 and the signal converter 42 must be capable of containing 128 lattice structures. The device of FIG. 3 includes a hard drive (not shown) for storing the data output from the CPU 30.

In the state that the level of each of the lattice structures is equally adjusted, when a user inputs distance data between lattice structures, and an order to operate the device of FIG. 2, the CPU 30 reads a program for calculating the speed of a baseball from the ROM 34. Then, the CPU 30 initializes the program by a distance between the lattice structures being input. The CPU 30 outputs a driving control signal to the driving unit 40 and signal converter 42 through the input and output interface 32. The driving unit 40 operates the light projectors of the sensors 101–115 according to the input driving control signal, thereby generating the infrared rays from each of the light projectors. The infrared rays discharged from the light projectors enter the light receivers corresponding to each of the light projectors.

In the state that the device of FIG. 3 is initialized, when a pitcher pitches a ball toward a catcher, the ball interrupts light paths within the lattice and a corresponding position signal is generated, depending upon the position of light paths interrupted. The sensed signal is output to display board 20 and the signal converter 42. The display board 20 determines whether the pitched ball is a strike or a ball by comparing the input position signal of the interrupted light with a predetermined strike zone. The display board 20 represents the determined position of the ball with a lamp. The signal converter 42 converts the input position signal of interrupted light into digital data which is synchronized to the clock of the controller 12 and outputs the digital data to the input and output interface 32. That is, the signal converter 42 converts the position signal of interrupted light being sensed through the light receivers of all the sensors 101–115, into the digital data which is synchronized to the base clock of the controller. Accordingly, the converted digital data are output to the input and output interface 32. When the CPU 30 receives the data output from the signal converter 42, the CPU 30 calculates the two-dimensional coordinate values of a ball passing through each of the lattice structures. The CPU 30 then calculates the speed of a ball passing through each of neighboring lattice structures using the time difference of input data and a stored distance between each of the lattice structures. Accordingly, the velocity of the pitched baseball is calculated by the two-dimensional coordinate values passing through each of the lattice structures and the elapsed time between the balls passing through a first and then a second neighboring lattice structure.

The CPU 30 changes the velocity of the pitched baseball, calculated at a vector value, into the unit of an interval speed calculated per each of the neighboring sensors, and thereafter stores it in the RAM 36. The distance between each of the sensors is freely adjusted. In the case that the lattice structures of the sensors are closely placed in the vicinity of a home plate, the user can minutely measure the degree that the pitched ball varies in the front of a batter. The interval speed of a baseball stored in the RAM 36 can be used to calculate an average speed according to a user's key input for calculating the average speed. The interval and average speeds of a baseball are calculated in the CPU 30 according to the user's need. The calculated values are displayed on monitor 16, or output through printer 18. The course of a baseball may also appear as a graphic representation according to the user's need, in which case it is output through the monitor 16 or the printer 18. The CPU 30 can store interval speed information in a hard disk. Accordingly, the CPU 30 can re-form the ball variation and the speed of a specific pitcher in the form of statistical data. The data connected with the motion variation of a baseball generated from a computer is transmitted to other systems through the communication port 38 according to the user's need.

The above first preferred embodiment shows the lattice structures of the sensors to be adjusted, and their level to be equalled. However, it is possible within the technical category of the present invention that since the sensors measure the level of each of the lattice structures, and the measured level values are input to the computer, the reference level of the lattice structures can be set in the computer.

In the method for detecting the motion variation of a baseball and device thereof of the present invention, the device comprises sensors for having a plurality of arranged forms between a beginning point and an ending point of motion, and detecting the position variation of a pitched baseball in the two-dimensional coordinate form; a computer for synchronizing the two-dimensional coordinate values output from the sensor to the inside clock being input the synchronized values, and calculating the speed of a baseball according to the distance among predetermined sensors and input two-dimensional coordinate values. Accordingly, the present invention can detect the curving degree and the speed variation of a baseball. Particularly, in the case that the lattice structures of the sensors are closely placed in the vicinity of the home plate, the user can minutely measure the motion variation of a baseball.

What is claimed is:

1. A method for detecting the motion variation of a projectile, the method comprising the steps of:

dividing an imaginary straight line between a first position corresponding to a pitcher of the projectile and a second position corresponding to a catcher of the projectile into designated intervals, and setting up a plurality of two-dimensional coordinate systems at right angles to said straight line, one of said coordinate systems being disposed at each of the plurality of divided positions;

calculating section intervals between a plurality of said divided positions;

outputting two-dimensional coordinate values corresponding to the position of the projectile passing through each of said coordinate systems; and detecting a quantity of motion variation of the projectile using said section intervals and two-dimensional coordinate values.

2. The method for detecting the motion variation of a projectile as claimed in claim 1, wherein said quantity of motion variation comprises the direction of the projectile.

3. The method for detecting the motion variation of a projectile as claimed in claim 1, wherein said quantity of motion variation comprises the speed of the projectile.

4. A device for detecting the motion variation of a projectile, comprising:

a plurality of sensors respectively situated at right angles to an imaginary straight line between a first position corresponding to a pitcher of the projectile and a second position corresponding to a catcher of the projectile, each of the sensors being disposed at one of a plurality of divided positions dividing the imaginary straight line, said sensors each having a plurality of light projectors and light receivers being placed opposite each other, and said sensors detecting the two-dimensional coordinate values of the passing projectile;

a controller for storing distance data between said divided positions, receiving the two-dimensional coordinate values from said sensors, and calculating the quantity of motion variation of the projectile; and means for outputting the quantity of motion variation calculated by the controller in a designated form.

5. The device for detecting the motion variation of a projectile claimed in claim 4, wherein said controller includes a signal converter for converting said two-dimensional coordinate values into data synchronized to a base clock.

6. The device for detecting the motion variation of a projectile claimed in claim 4, further comprising a display board for receiving a two-dimensional coordinate value from a sensor nearest said second position, thereby displaying the position of a projectile.

7. The device for detecting the motion variation of a projectile claimed in claim 4, further comprising a display board for displaying the course of a projectile in the form of a graphic screen.

8. The device for detecting the motion variation of a projectile claimed in claim 4, further comprising order input means for controlling the operation of the controller.

9. The device for detecting the motion variation of a projectile claimed in claim 4, wherein the motion variation includes variations in projectile speed.

10. The device for detecting the motion variation of a projectile claimed in claim 4, wherein the motion variation includes variations in the direction of travel of the projectile.

* * * * *